O. H. HANSEN.
METHOD OF TREATING SUBSTANCES.
APPLICATION FILED JAN. 7, 1919.

1,390,703.

Patented Sept. 13, 1921.

INVENTOR-
O. H. Hansen
BY W. H. Lieber
ATTORNEY.

UNITED STATES PATENT OFFICE.

OSWALD H. HANSEN, OF PORT WASHINGTON, WISCONSIN, ASSIGNOR OF ONE-HALF TO THE WISCONSIN CHAIR COMPANY, OF PORT WASHINGTON, WISCONSIN.

METHOD OF TREATING SUBSTANCES.

1,390,703. Specification of Letters Patent. Patented Sept. 13, 1921.

Application filed January 7, 1919. Serial No. 270,004.

*To all whom it may concern:*

Be it known that I, OSWALD H. HANSEN, a citizen of the United States, residing at Port Washington, in the county of Ozaukee and State of Wisconsin, have invented a certain new and useful Method of Treating Substances, of which the following is a specification.

This invention relates in general to an improved method of and apparatus for treating fluent substances by subjecting them to variations in temperature, and relates specifically to an improved method of and apparatus for cooking, sterilizing, cooling or otherwise treating batches of fluent foods after they have been placed in either open or inclosed containers.

An object of the invention is to provide a simple and efficient method of treating batches of fluent food stuffs. Another object of the invention is to provide simple and efficient apparatus for effecting commercial exploitation of the method.

It has for many years been established practice in the canning industry, to sterilize or heat treat canned fluent food substance such as a mixture of green peas and brine, by intermittently placing a number of sealed cans of the substance into a closed chamber and then gradually applying heat. After the cans have been thus heated to the proper temperature for a desirable length of time, the heat is gradually dissipated and the treated cans are removed from the chamber to permit like treatment of a subsequent lot of cans. So far as the efficiency of the treatment is concerned, this method is highly satisfactory, but it is too slow for the modern high speed filling machines.

In order to increase the capacity and to perform the entire sterilizing operation automatically, machines have been devised in which the sealed cans of substance are successively delivered into and transported through a heated chamber having a uniform relatively high temperature. While these machines have enormously increased the capacity over that of the prior intermittent sterilizers, they have proven objectionable for several essential reasons. In the first place, the sudden admission of the sealed cans of product from atmospheric temperature to a zone of relatively high temperature, produces sudden and unequal relative expansion of the cans and the inclosed product, thus straining the can seams and sometimes distorting the cans. Another objection to these automatic sterilizers is that the cans are suddenly heated, the sudden heating of the product degrading the same and causing it to spoil more readily.

It has also been found by laboratory experiment, that sterilization of fluent substances can be more rapidly and efficiently accomplished by subjecting the substance to heat while in an open rather than in a sealed container. These experiments have also demonstrated that the rate of sterilization may be vastly augmented by agitating the substance during treatment.

The present invention has for its object the provision of a method of and means for effecting continuous, automatic and efficient sterilization of fluent food stuffs such as a mixture of green peas and brine, by placing batches of the substance in containers and gradually applying heat and subsequently cooling the substance with the containers either open or sealed. The invention further contemplates the provision of a method of and means for treating the cans of food stuff immediately after they have been delivered from the filler and before sealing. A further object of the invention is the provision of means for agitating open cans of food stuff during the process of sterilization. Still another object is to provide simple and efficient means for sealing a sterilizing chamber to prevent escape of heating medium while the cans are being admitted to and exhausted from the chamber. These and other objects and advantages will appear from the following description.

The term "batches" as employed herein is intended to include any relatively small amounts of a mass of substance. The term "food" as employed herein is intended to include any substance containing food value of any kind. The term "fluent" includes any material capable of flowing, whether it be a liquid, a mixture of liquid and granular material, or finely divided granular material alone. It will also be apparent that agitation of the cans during sterilization need not be effected by rotating them, as oscillation or mere shaking will accomplish the same results.

A clear conception of the various steps of the process and of an embodiment of apparatus for exploiting the same, may be had by referring to the drawing accompanying and forming a part of this specification in which like reference characters designate the same or similar parts in the various views.

Figure 3:
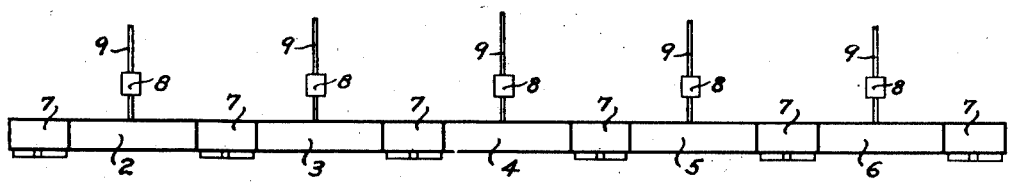
Fig. 3 is a diagrammatic disclosure of a complete cooking or sterilizing device embodying five successive chambers through which the cans are transported during sterilization.

The cooking or sterilizing device illustrated in Fig. 3 comprises in general a casing forming a series of five chambers 2, 3, 4, 5, 6. Each of these chambers is provided with an inlet 9 for heating medium such as steam, having associated therewith devices 8 for automatically controlling the temperature and pressure in the successive chambers. These automatic control devices 8 are of well known construction and detailed disclosure thereof has been omitted as they are only involved generally in the present invention. The automatic devices 8 are set to establish and maintain gradually increasing and decreasing temperatures and pressures in the successive chambers 2, 3, 4, 5, 6. As an arbitrary example, during treatment of canned peas for an atmospheric temperature of 80 degrees, the devices 8 might be set to establish temperatures in the five successive chambers of 124 degrees, 168 degrees, 212 degrees, 168 degrees and 124 degrees, respectively. The actual temperatures must however be determined from the characteristics of the particular food stuff which is being treated, as some products require and will withstand higher temperatures than others, without danger of injury.

In the embodiment of the invention illustrated, the successive chambers 2, 3, 4, 5, 6 are connected in series by means of can feeding and steam packing devices 7, located between successive chambers and at the inlet and discharge of the chambers 2, 6, respectively. The details of these devices are shown somewhat schematically in Figs. 1 and 2. The device 7 comprises in general a pair of oppositely revolving rotors 13, 14 mounted upon vertical shafts 15, 16 respectively, and housed within a suitable inclosing casing. The rotors 13, 14 are revoluble by means of gearing 27 associated with the lower extremities of the shafts 15, 16. Each of the rotors 13, 14 has a plurality of diametrically opposite recesses and intermediate cylindrical surfaces between successive recesses. Packing cylinders 17, 18 are attached to the rotors 13, 14 respectively at diametrically opposed recesses thereof, the cylinders 17 of the rotor 13 being adapted to enter the unoccupied recesses of the rotor 14, and those of the rotor 14 being adapted to enter the unoccupied recesses of the rotor 13, during revolution of the rotors. The packing cylinders 17, 18 are also adapted to coact with cylindrical inner surfaces of the rotor inclosing casing as illustrated. The cylindrical surfaces of the rotors 13, 14 located between the recesses are adapted to roll upon each other.

Figure 1:
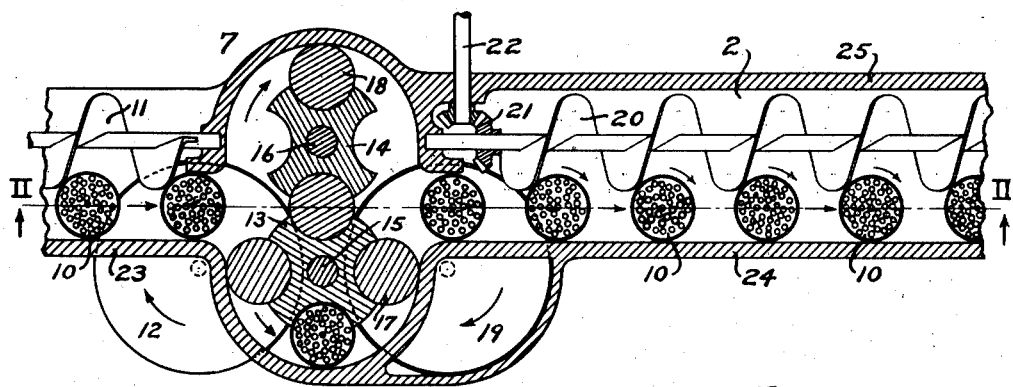
Figure 1 is a fragmentary horizontal sectional view of a cooking or sterilizing device for treating substances packed in either open or inclosed cylindrical receptacles.
Figure 2:
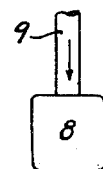
Fig. 2 is a fragmentary vertical sectional view of a cooking or sterilizing device for treating substances packed in either open or closed cylindrical receptacles, the section being taken along the line II—II of Fig. 1 looking in the direction of the arrows.
Figure 2:
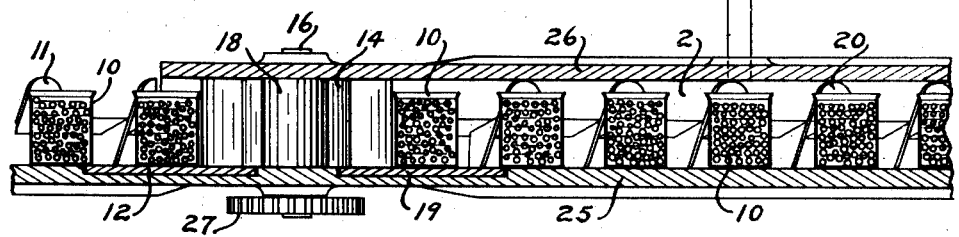

The device 7 as shown specifically in Figs. 1 and 2 is especially adapted to feed cans 10 from a region of relatively low temperature and pressure to one of higher temperature and pressure. It will be obvious that the device 7 may be readily applied as an exhaust box for delivering treated cans from a region of high temperature and pressure to one of lower temperature and pressure, but the device when thus used will not positively prevent escape of heating medium.

The mechanism for feeding cans 10 to the device 7 comprises a screw or other desirable type of conveyer 11 adapted to deliver the cans at properly spaced intervals, upon the rotating transporting disk 12. The screw conveyer 11 urges the upright open cans 10 along the guide wall 23 and slides them gently upon the disk 12 which coöperates with the device 7 to feed the cans into the successive unoccupied recesses of the rotor 13.

Each of the chambers 2, 3, 4, 5, 6 has a lower casing 25 and a removable cover 26. These elements may be suitably insulated to prevent radiation of heat. Within each sterilizing chamber is located a screw conveyer 20 adapted to urge the cans 10 through the corresponding chamber along a wall 24, and to simultaneously agitate the material in the cans by rotating the cans 10 as indicated in Fig. 1. The conveyers 20 are rotatable by means of shafts 22 through gearing 21. The cans 10 are delivered to the conveyers 20 from the devices 7 by means of rotating transporting disks 19.

During the normal operation of the apparatus in the exploitation of the process forming the subject of this invention, the proper temperatures and pressures necessary for efficient treatment of the specific food stuff which is to be sterilized, are established in the successive chambers 2, 3, 4, 5, 6 by means of steam admitted through the automatic control devices 8. The various elements are set in motion as indicated by the arrows in Fig. 1. The open cans 10 filled with the food stuff which is to be treated, are successively fed to and transported through the successive sterilizing chambers 2, 3, 4, 5, 6 by means of the screw conveyers 11, 20; the disks 12, 19 and the rotors 13, 14. Simultaneously with the transportation of the cans 10 through the sterilizing chambers, the contents of these cans are agitated by the conveyers 20 which impart rotation to the cans about their vertical axes. The devices 7 feed the cans 10 from one region to another but prevent escape of heating medium as the successive regions are at all times positively sealed against direct communication.

It will thus be noted that the successive cans 10 are automatically transported through zones of successively gradually increasing and diminishing temperatures and pressures, thereby producing most efficient sterilization and maximum capacity. The degree of sterilization which must be altered in accordance with the characteristics of the different products, may be readily varied by altering the rate of movement of the transporting appliances and by varying the thermal conditions in the sterilizing chambers 2, 3, 4, 5, 6. The product is not subjected to any undesirable sudden temperature or pressure variations such as would tend to degrade the same. The cans 10 may be treated open without danger of waste as the transfer is gradual throughout. The degree of agitation may also be varied by providing other instrumentalities for performing this function, the present disclosure being only one of numerous contemplated devices for accomplishing this function and having been selected on account of its simplicity. The sterilizer of the present invention may be located in the canning factory, directly between the filling machine and the can closing machine and will automatically sterilize the product delivered by the filler, before the cans are finally sealed.

It should be understood that it is not desired to limit the present invention to the exact steps of the process or to the details of the apparatus herein specifically disclosed, for various modifications within the scope of the appended claims may occur to persons skilled in the art.

It is claimed and desired to secure by Letters Patent:—

1. The process of sterilizing food, which comprises, transporting the food in containers through segregated successive zones of gradually increased temperature, and subsequently transporting said containers through segregated successive zones of gradually decreasing temperature.

2. The process of sterilizing food, which comprises, transporting the food in open containers through segregated successive zones of gradually increasing temperature, and subsequently transporting said open containers through segregated successive zones of gradually decreasing temperature.

3. The process of sterilizing food, which comprises, simultaneously agitating and transporting the food in containers through segregated successive zones of gradually increasing temperature, and subsequently transporting said containers through segregated successive zones of gradually decreasing temperature.

4. The process of sterilizing food, which comprises, simultaneously agitating and transporting the food in open containers through segregated successive zones of gradually increasing temperature, and subsequently transporting said open containers through segregated successive zones of gradually decreasing temperature.

In testimony whereof, the signature of the inventor is affixed hereto.

OSWALD H. HANSEN.